United States Patent [19]

Sacripante et al.

[11] Patent Number: 5,427,882

[45] Date of Patent: Jun. 27, 1995

[54] LOW MELT POLYESTER IMIDE TONER COMPOSITIONS

[75] Inventors: Guerino G. Sacripante, Oakville; B. W. Anissa Yeung, Mississauga; T. Brian McAneney, Burlington, all of Canada; J. Stephen Kittelberger, Rochester, N.Y.

[73] Assignee: Xerox Corporation, Stamford, Conn.

[21] Appl. No.: 282,299

[22] Filed: Jul. 29, 1994

[51] Int. Cl.⁶ .......................................... G03G 9/087
[52] U.S. Cl. ..................................................... 430/109
[58] Field of Search ................................ 430/109, 110

[56] References Cited

U.S. PATENT DOCUMENTS

| | | | |
|---|---|---|---|
| 4,513,074 | 4/1985 | Nash et al. | 430/106.6 |
| 4,543,313 | 9/1985 | Mahabadi et al. | 430/109 |
| 4,560,635 | 12/1985 | Hoffend et al. | 430/106.6 |
| 5,238,768 | 8/1993 | Ong | 430/110 |
| 5,266,429 | 11/1993 | Sorriero et al. | 430/96 X |
| 5,348,831 | 9/1994 | Sacripaite et al. | 430/109 |

OTHER PUBLICATIONS

Encyclopedia of Polymer Science and Engineering, vol. 12, 1985, pp. 364 to 383.

*Primary Examiner*—Roland Martin
*Attorney, Agent, or Firm*—E. O. Palazzo

[57] ABSTRACT

A toner composition comprised of pigment, and a polyester imide of the formula

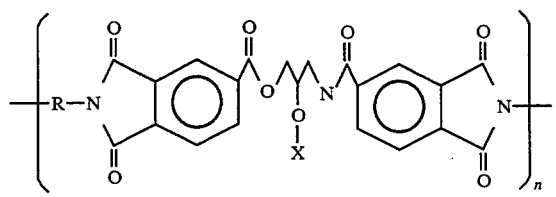

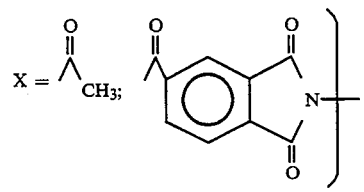

wherein n represents the number of monomer segments; X is acetyl or a carbonyl-phthalimido; and R is alkylene, oxyalkylene, or polyoxyalkylene.

22 Claims, No Drawings

LOW MELT POLYESTER IMIDE TONER COMPOSITIONS

BACKGROUND OF THE INVENTION

This invention is generally directed to toner and developer compositions, and more specifically, the present invention is directed to developer and toner compositions containing certain polyester imide resins, such as those derived from JEFFAMINE TM, and a dianhydride, such as 1,3-bis-(1',2'-anhydro-4'-trimellitate)-2-acetoxypropane or mixture of about 80 to about 98 percent by weight of dianhydride, and about 2 to about 20 weight percent of trianhydride, such as 1,2,3-tris-(1',2'-anhydro-4'-trimellitate)-propane, and process for the preparation of polyester imide resins thereof. In embodiments, there are provided in accordance with the present invention, low cost, low melting and excellent vinyl offset toner compositions comprised of certain polyester imide amine resins obtained, for example, by melt condensation processes, and pigment particles comprised of, for example, carbon black, magnetites, or mixtures thereof, thereby providing for the development and generation of black and/or colored images. In embodiments, there are provided in accordance with the present invention polyester imide resins of the following formula

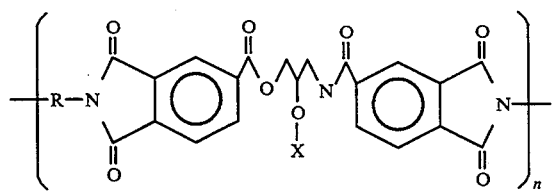

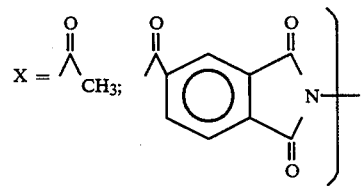

and in embodiments wherein X is a mixture containing from about 80 mole percent to about 98 mole percent of an acetyl group and from about 2 mole percent to about 20 mole percent of trimellitimide branching group; n represents the number of repeating segments and can be a number of from about 10 to about 1,000; and R is an aliphatic component such as alkylene, oxyalkylene or polyoxyalkylene. The toner compositions of the present invention in embodiments possess a number of advantages including exceptional nonvinyl resistance, low fixing characteristics such as from about 125° C. to about 145° C., deinking characteristics, excellent blocking characteristics, such as from about 55° C. to about 65° C., and low relative humidity sensitivities. The polyester imides of the present invention can in embodiments be generated by the reaction of a dianhydride, such as 1,3-bis-(1', 2'-anhydro-4'-trimellitate)-2'-acetoxypropane available as AC-32 TM from Anhydride and Chemicals Incorporated, or a mixture of the aforementioned dianhydride and trianhydride such as 1,2,3-tris-(1', 2'-anhydro-4'-trimellitate)-propane and, such mixtures being available as AC-3205 TM from Anhydride and Chemicals Incorporated, and believed to be of the following formula with a molecular weight equivalent of from about 482 grams per mole to about 614 grams per mole

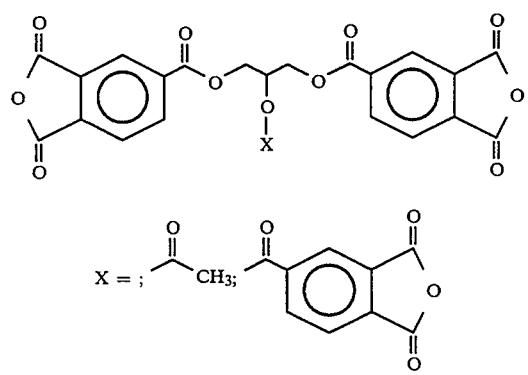

with a diamino terminated alkylene, such as an aliphatic diamines, oxyalkylene or polyoxy alkylene, such as JEFFAMINES TM available from Texaco Chemicals as JEFFAMINE D-230 TM, D-400 TM, D-700 TM, EDR-148 TM, EDR-192 TM and believed to be of the following formula, or aliphatic diamines like DYTEK TM

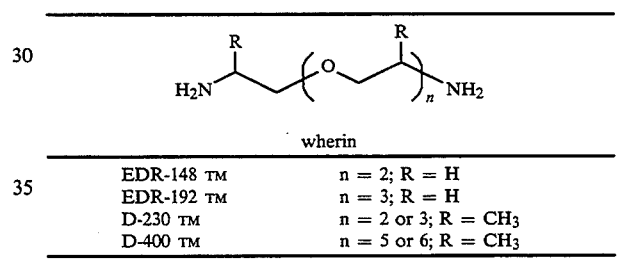

| | wherin |
|---|---|
| EDR-148 TM | n = 2; R = H |
| EDR-192 TM | n = 3; R = H |
| D-230 TM | n = 2 or 3; R = $CH_3$ |
| D-400 TM | n = 5 or 6; R = $CH_3$ |

The aforementioned polyester imides exhibit in embodiments a number average molecular weight of from about 2,500 grams per mole to about 100,000 grams per mole as measured by vapor phase osmometry, have a glass transition temperature of from about 45° C. to about 65° C., and more preferably of from about 50° C. to about 65° C. as measured by the Differential Scanning Calorimeter, low fixing characteristics, such as from about 125° C. to about 145° C., and rapid jetting characteristics, such as rates of from about 0.90 to about 2.2 relative to poly(propoxylated bisphenol A) toner resins, and a $M_w$ of from about 1,500 to about 20,000.

Toners with the polyester imides of the present invention possess low melt fusing temperatures, for example 28° C. lower than certain styrene based toners, such as the Xerox Corporation 1075, which can exhibit a broad fusing latitude of about 50° C., and also the polyester imide polymer of the present invention has excellent vinyl offset resistance.

The transfer of toner from xerographic images to plasticized polyvinylchloride (PVC) notebook covers has been a problem since, for example, severe damage caused to the hardcopy. This phenomenon is commonly referred to as vinyl offset and is related to the diffusion of plasticizer from the vinyl into the toner resin. Vinyl offset is measured by the following method. A plain sheet of paper is placed under the clear vinyl sample to provide a good contrast. The image of a single frame of the sample covering approximately a 9 millimeter square area is captured in a full color frame of the video processing board. This full color image is then converted into a gray scale image by adjusting its RGB components. An intensity histogram of this gray scale image is performed and a threshold intensity level is determined. This step totally eliminates subjective judgment by the operator. All pixels with intensities below the threshold level are considered to represent offset toner. Conversely, all pixels above the threshold level are considered to represent clear vinyl. For clarity, pixels representing offset toner are displayed in black and pixels representing clear vinyl are displayed in red. The number of pixels representing the vinyl offset is then determined for each frame. The vinyl offset for a single frame is calculated using the following formula Vinyl offset=(Offset Pixels/Total Pixels)×100%   (1)

The entire sample is scanned frame-by-frame and the vinyl offset is obtained by taking the average over all frames. For example, in the case of severe offset, where all the toner transfers onto PVC, the vinyl offset is recorded as 100 percent. On the other hand, in the case where no toner transfers to the PVC the vinyl offset is recorded as 0 percent as calculated by Equation (1).

The type of plasticizer used in the PVC affects vinyl offset, however, the major components appear to be the polymeric structure of the toner resin and molecular weight. For example, styrene-butylmethacrylate toner exhibits severe vinyl offset, such as from about 85 to 95 percent, whereas the styrene-butadiene based toner resins exhibit a much lower degree of vinyl offset, such as from about 0.3 to about 0.9 percent. It should be noted that even though the vinyl offset value is small for the styrene-butadiene based toner images, this level of offset is still visible to the naked eye. There is, therefore, a need for toner images wherein no vinyl offset results, and wherein there is specifically a vinyl offset of 0 percent as calculated by Equation (1). In addition, there is a need for toners to display in addition to 0 percent vinyl offset, low fixing temperature of from about 120° C. to about 140° C., with a fusing latitude of from about 20° C. to about 60° C., and which exhibits low relative humidity sensitivity, such as from about 1.0 to about 2.9, and wherein matte images are obtained, such as from about 0 gloss units to about 20 gloss units, as measured by the Gardner gloss metering unit.

A number of toner resins are known, such as styrene acrylates, styrene methacrylates, styrene butadiene, polyesters, polyamides, and the like.

Certain polyimide resins and, more specifically, liquid crystalline polyimide resins are known such as summarized and illustrated in the *Encyclopedia of Polymer Science and Engineering*, 2nd Edition, Volume No. 12, published by Wiley (1985). However, such polyimide resins are aromatic and useful as high performance materials, there being no disclosure for use as toners.

Thermotropic liquid crystalline polyimides are illustrated in U.S. Pat. No. 5,348,830, the disclosure of which is wholly incorporated herein by reference, which discloses toner and developer compositions with thermotropic liquid crystalline polyimides. The polyester imide resins of this invention differ in that, for example, they do not exhibit liquid crystalline properties, and moreover are of substantially lower cost such as from about 80 percent to about 500 percent less than the liquid crystalline polyimides of U.S. Pat. No. 5,348,830 as estimated, for example, from the Chemical Marketing Reporter (1993 issue).

Illustrated in the following copending applications, the disclosures of each being totally incorporated herein by reference, are:

U.S. Ser. No. 144,075, illustrates a toner composition comprised of a pigment and a crosslinked polyimide, and wherein the crosslinked polyimide can be obtained from the reaction of a peroxide with an unsaturated polyimide of the formula

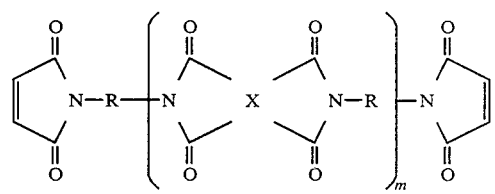

wherein X is

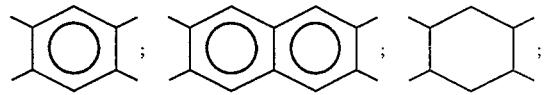

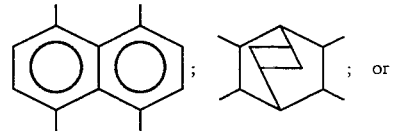

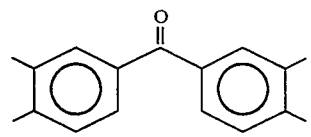

R is alkyl or oxyalkylene; and m represents the number of monomer segments present and is a number of from about 10 to about 1000.

U.S. Pat. No. 5,348,831, illustrates a toner composition comprised of pigment, and a polyester imide resin of the formula

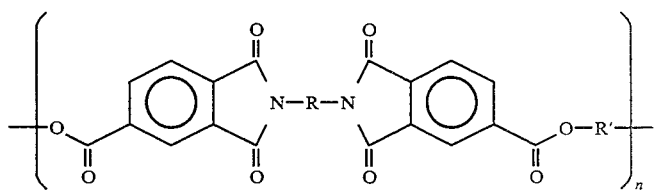

wherein n represents the number of segments present and is a number of from about 10 to about 10,000; R' is alkyl or alkylene; and R is independently selected from the group consisting of an oxyalkylene and polyoxyalkylene. Note that R' is a difunctional moiety and derived from a diol, and this differs in that the polyester imide of this invention is represented by a trifunctional moiety linked via ester groups and derived from a triol, hence providing the resin with the ability of branching and leading to broader polydispersity resin useful for matte toner applications with enhanced vinyl offset properties.

U.S. Ser. No. 144,918, illustrates a toner composition comprised of pigment, and polyimide of the formula

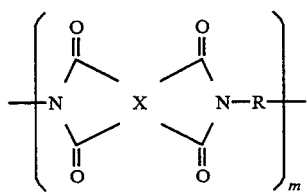

wherein m represents the number of monomer segments present; X is

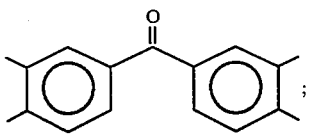

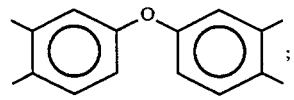

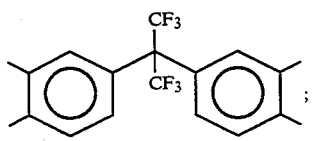

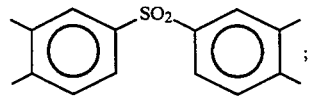

or

thus X can be benzophenone, oxydiphthalic, hexafluoropropane diphenyl, diphenyl sulfone, or biphenyl; X is attached to four imide carbonyl moieties; and R is independently selected from the group consisting of alkylene, oxyalkylene and polyoxyalkylene.

U.S. Ser. No. 144,956, illustrates a toner composition comprised of pigment, and polyimide of the formula

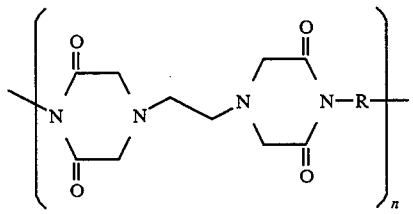

wherein n represents the number of monomer segments, and is a number of from about 10 to about 1,000; and R is alkylene, oxyalkylene, or polyoxyalkylene.

Furthermore, there are also disclosed in copending applications U.S. Ser. No. 221,956 and U.S. Ser. No. 251,161 polyimide toner resins with deinkable characteristics. More specifically, copending application U.S. Ser. No. 221,956 discloses a toner comprised of pigment, and a polyimide-imine resin of the formula

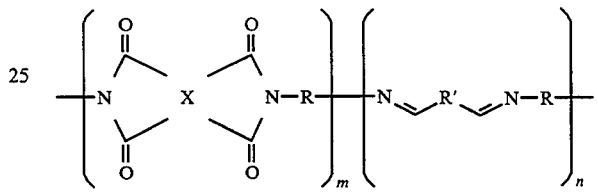

wherein m and n represent the number of monomer segments; X is independently selected from the group consisting of a tetravalent aromatic, polyarylomatic or cycloaliphatic group with from about 6 to about 20 carbon atoms and a cycloaliphatic group; R is independently selected from the group consisting of alkylene, oxyalkylene and polyoxyalkylene; and R' is independently selected from the group consisting of alkyl, alkylene and arylene; and U.S. Ser. No. 251,161 discloses a toner composition comprised of pigment, and a polyimide of the formulas

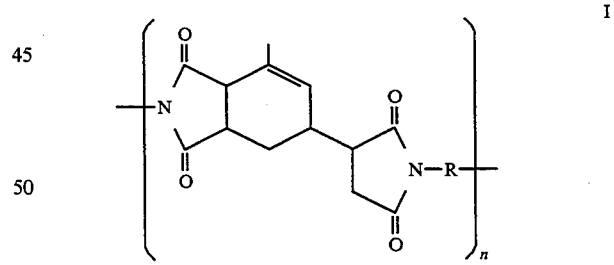
I or

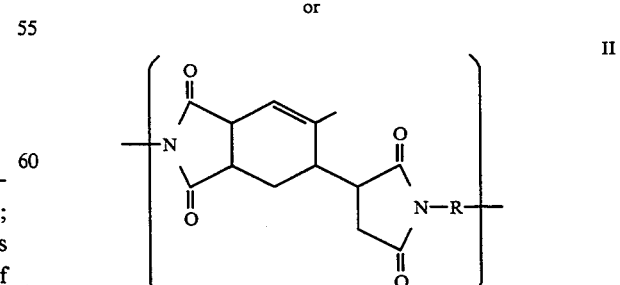
II wherein n represents the number of monomer segments, and R is alkylene, oxyalkylene or polyoxyalkylene. The polyester imide of this invention displays 0 percent vinyl offset as calculated by Equation (1).

The disclosures of each of the copending patent applications mentioned herein are totally incorporated herein by reference.

SUMMARY OF THE INVENTION

Examples of objects of the present invention include:

It is an object of the present invention to provide toner and developer compositions with many of the advantages illustrated herein.

In another object of the present invention there are provided low melting toner compositions with certain polyester imides, and which toners are useful for the development of electrostatic latent images including color images.

In yet another object of the present invention there are provided processes for the preparation of certain polyester imides by melt condensation methods.

Additionally, in another object of the present invention that are provided low melting toner compositions with rapid jetting rates, and wherein such toners avoid or minimize paper curl and enable high resolution developed images.

In another object of the present invention there are provided toners with low melt fusing temperatures of from about 12° C. to about 145° C., and a broad fusing latitude of from about 20° C. to about 60° C.

Moreover, in another object of the present invention there are provided toner compositions comprised of polyester imides with glass transition temperature of from about 48° C. to about 65° C., and preferably from about 50° C. to about 60° C.

In yet another object of the present invention that are provided toner compositions comprised of polyester imides with a weight average molecular weight of from about 1,500 grams per mole to about 100,000 gram per mole as measured by GPC.

Further, it is an object of the present invention to provide toners which display low gloss, such as from about 0 to about 20 gloss units as measured by the Gardner Gloss metering unit, and excellent crease characteristics, and which toners possess deinkable characteristics in embodiments.

Moreover, it is an object of the present invention to provide a toner, which displays low relative sensitivity, such as from a about 1.0 to about 2.9 as measured from the triboelectric charge ratio at the 20 percent humidity level and 80 percent humidity level.

Another object of the present invention resides in the formation of toners which will enable the development of images in electrophotographic imaging and printing apparatuses, which images have substantially no background deposits thereon, are substantially smudge proof or smudge resistant, and, therefore, are of excellent resolution; and further, such toner compositions can be selected for high speed electrophotographic apparatuses, that is those exceeding 70 copies per minute.

Also, in another object of the present invention there are provided polyimide resins with rapid jetting properties such as relative jetting rates of from about 1.0 to about 4.0, and preferably from about 1.2 to about 2.0.

Further, in another object of the present invention there are provided polyimide resins with no vinyl offset properties such as about 0 percent vinyl offset as calculated by Equation (1).

These and other objects of the present invention can be accomplished in embodiments thereof by providing toner compositions comprised of polyester imides of the formula illustrated herein, wherein X is, for example, acetyl, a carbonyl-phthalimido, and the like, and pigment particles.

The polyester imide resins of the present invention can be prepared as illustrated herein, and more specifically, by charging a reactor equipped with a bottom drain valve, double turbine agitator and distillation receiver with a cold water condenser with from about 0.95 to about 1.05 mole of 1,3-bis-(1',2'-anhydro-5°-trimellitate)-2-acetoxypropane, available from AC Dianhydride Chemical Company as AC-32 TM dianhydride, and 0.95 to about 1.05 mole of a flexible diamine, such as a diamino terminated polyoxypropylene, available as JEFFAMINE 230 TM from Texaco Chemicals. The reactor is then heated to about 150° C. to about 170° C. with stirring for a duration of from about 3 hours whereby 0.5 to about 0.9 mole of water byproduct is collected in the distillation receiver. The mixture is then heated at from about 180° C. to about 210° C., after which the pressure is slowly reduced from atmospheric pressure to about 300 Torr, over a period of from about one hour to about 5 hours with collection of approximately 0.1 to about 0.3 mole of water in the distillation receiver, and wherein the total amount of water collected from the beginning of the reaction is from about 0.95 to about 1.0 mole equivalent. The reactor is then purged with nitrogen to atmospheric pressure, and the resulting product, such as poly(alkyleneoxyalkyleneoxyalkylene 1,2-imidophenyl-4-carbonyl-1'-oxy-2'-(acetyloxy)-3'-oxypropylene-3'-oxypropylene-4"carbonylphenyl-1",2"-imido), is collected through the bottom drain valve. The glass transition temperature of the resin can then be measured and in embodiments is from about 45° C. to about 65° C. (onset) utilizing the 910 Differential Scanning Calorimeter available from E. I. DuPont operating at a heating rate of 10° C. per minute. The number average molecular weight can be measured and in embodiments is from about 1,500 grams per mole to about 20,000 grams per mole by vapor phase calorimetry.

Specific examples of polyester imide resins include poly(ethylene 1,2-imidophenyl-4-carbonyl-1'-oxy-2'-(acetyloxy)-3'-oxypropylene-4"carbonylphenyl-1",2"-imido), poly-(propylene 1,2-imidophenyl-4-carbonyl-1'-oxy-2'-(acetyloxy)-3'-oxypropylene-4"carbonylphenyl-1",2"-imido), poly-(butylene 1,2-imidophenyl-4-carbonyl-1'-oxy-2'-(acetyloxy)-3'-oxypropylene-4"carbonylphenyl-1",2"-imido), poly-(2-methylpentylene 1,2-imidophenyl-4-carbonyl-1'-oxy-2'-(acetyloxy)-3'-oxypropylene-4"carbonylphenyl-1",2"-imido), poly(ethyleneoxyethyleneoxyethylene 1,2-imidophenyl-4-carbonyl-1'-oxy-2'-(acetyloxy)-3'-oxypropylene-4"carbonylphenyl-1",2"-imido), poly-(ethyleneoxyethyleneoxyethyleneoxyethylene 1,2-imidophenyl-4-carbonyl-1'-oxy-2'-(acetyloxy)-3'-oxypropylene-4"carbonylphenyl-1",2"-imido), poly-(propyleneoxypropyleneoxypropyleneoxylpropylene 1,2-imidophenyl-4-carbonyl-1'-oxy-2'-(acetyloxy)-3'-oxypropylene-4"carbonylphenyl-1",2"-imido), copoly(propyleneoxypropyleneoxypropyleneoxypropylene 1,2-imidophenyl-4- carbonyl-1'-oxy-2'-(acetyloxy)-3'-oxypropylene-4"carbonylphenyl-1", 2"-imido-copoly-(propyleneoxypropyleneoxypropyleneoxypropylene 1,2-imidophenyl-4-carbonyl-1'-oxy-3'-oxypropylene-4"carbonylphenyl-1",2"-imido)-g-2'-(4'''carbonyl-phenyl-1''',2'''-phthalimido), mixtures thereof, and the like.

Specific examples of tetraacid or dianhydride monomers that can be utilized to prepare the polyester imide include 1,3-bis-(1',2'-anhydro-4'-trimellitate)-2-acetoxypropane available as AC-32 TM from Anhydride and Chemical Incorporated, 1,3-bis-(1',2'-anhydro-4'-trimellitate)-2-hydroxypropane, 1,2,3-tris-(1',2'-anhydro-4'-trimellitate)propane, 1,2-bis-(1',2'-anhydro-4'-trimellityl)-3-acetoxypropane, and mixtures thereof, such as AC-3205 TM available from Anhydride Chemical Incorporated. These monomers are selected in various effective amounts, such as from about 0.45 mole equivalent to about 0.55 mole equivalent Specific examples of diamino alkanes or diamino alkylene oxides that can be utilized to prepare the polyester imides include diaminoethane, diaminopropane, 2,3-diaminopropane, diaminobutane, diaminopentane, diamino-2-methylpentane, also known as DYTEK A TM available from DuPont Chemical Company, diaminohexane, diamino-trimethylhexane, diaminoheptane, diaminooctane, diaminononane, diaminodecane, diaminododecane, diaminoterminated-ethylene oxide, diaminoterminated-diethylene oxide available as JEFFAMINE EDR-148 TM from Texaco Chemicals, diaminoterminated-diethylene oxide available as JEFFAMINE EDR-148 TM from Texaco Chemicals, diaminoterminated-triethylene oxide available as JEFFAMINE EDR-192 TM from Texaco Chemicals, diaminoterminated-polyoxypropytene oxide available from Texaco Chemicals as JEFFAMINE D-230 TM, JEFFAMINE 400 TM, JEFFAMINE 700 TM, mixtures thereof, and the like. This component is selected in various effective amounts such as from about 0.45 mole equivalent to about 0.55 mole equivalent of the polyester imide resin.

Various known colorants present in the toner in an effective amount of, for example, from about 1 to about 25 percent by weight of toner, and preferably in an amount of from about 1 to about 10 weight percent, that can be selected include carbon black like REGAL 330 ® magnetites, such as Mobay magnetites MO8029 TM, MO8060 TM; Columbian magnetites; MAPICO BLACKS TM and surface treated magnetites; Pfizer magnetites, CB4799 TM, CB5300 TM, CB5600 TM, MCX6369 TM; Bayer magnetites, BAYFERROX 8600 TM, 8610 TM; Northern Pigments magnetites, NP-604 TM, NP-608 TM; Magnox magnetites TMB-100 TM, or TMB-104 TM; and other equivalent black pigments. As colored pigments there can be selected known cyan, magenta, yellow, red, green, brown, blue or mixtures thereof. Specific examples of pigments include HELIOGEN BLUE L6900 TM, D6840 TM, D7080 TM, D7020 TM, PYLAM OIL BLUE TM and PYLAM OIL YELLOW TM, PIGMENT BLUE 1 TM available from Paul Uhlich & Company, Inc., PIGMENT VIOLET 1 TM, PIGMENT RED 48 TM, LEMON CHROME YELLOW DCC 1026 TM, E.D. TOLUIDINE RED TM and BON RED C TM available from Dominion Color Corporation, Ltd., Toronto, Ontario, NOVAperm YELLOW FGL TM, HOSTAPERM PINK E TM from Hoechst, and CINQUASIA MAGENTA TM available from E. I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color index as Cl 60710, Cl Dispersed Red 15, diazo dye identified in the Color Index as Cl 26050, Cl Solvent Red 19, and the like. Illustrative examples of cyan materials that may be used as pigments include copper tetra-(octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK TM and cyan may also be selected as pigments, and are employed in effective amounts of from, for example, about 1 weight percent to about 50 weight percent of the toner.

The toner may also include known charge additives such as alkyl pyridinium halides, bisulfates, the charge control additives of U.S. Pat. Nos. 3,944,493; 4,007,293; 4,079,014; 4,394,430 and 4,560,635 which illustrates a toner with a distearyl dimethyl ammonium methyl sulfate charge additive, the disclosures of which are totally incorporated herein by reference, negative charge additives like aluminum complexes, such as BONTRON E-88 TM, available from Orient Chemicals, and the like.

Surface additives that can be added to the toner compositions of the present invention include, for example, metal salts, metal salts of fatty acids, colloidal silicas, tin oxides, titanium oxides, mixtures thereof, and the like, which additives are usually present in an amount of from about 0.1 to about 1 weight percent, reference for example U.S. Pat. Nos. 3,590,000; 3,720,617; 3,655,374 and 3,983,045, the disclosures of which are totally incorporated herein by reference. Preferred additives include zinc stearate and AEROSIL R972 ® available from Degussa Chemicals. Also, waxes, such as polypropylene and polyethylene, can be added to the toner in amounts of, for example, from about 0.1 to about 3 weight percent.

In another embodiment of the present invention there are provided, subsequent to known micronization and classification, toner with an average volume diameter of from about 5 to about 20 microns comprised of polyimide resin, and pigment particles, and optional charge enhancing additives.

The polyimide resin is present in a sufficient, but effective amount, for example from about 70 to about 95 weight percent. Thus, when 1 percent by weight of a charge enhancing additive is present, and 10 percent by weight of pigment or colorant, such as carbon black, is contained therein, about 89 percent by weight of resin is selected. Also, the charge enhancing additive may be coated on the pigment particles.

The toner and developer compositions of the present invention may be selected for use in electrostatographic imaging apparatuses containing therein known photoreceptors. Thus, the toner and developer compositions of the present invention can be used with layered photoreceptors, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

Developer compositions include carrier particles, and the polyimide toners illustrated herein, examples of carriers being steel, iron, ferrites, silicon oxides, and the like, coated or uncoated, reference for example U.S. Pat. Nos. 4,937,166 and 4,935,326, the disclosures of which are totally incorporated herein by reference.

The following Examples are being provided to further define various species of the present invention, and these Examples are intended to illustrate and not limit the scope of the present invention. Parts and percentages are by weight unless otherwise indicated.

EXAMPLE I

A polyester imide resin derived from diamino terminated propylene oxide JD-230 TM and 1,3-bis-(1',2'-anhydro-3'-trimellitate)-2-acetoxypropane was prepared as follows.

To a 1 liter Parr reactor equipped with a bottom drain valve, a magnetic stirrer and distillation condenser apparatus for trapping the water byproduct were added the diamino terminated propylene oxide JD-230 TM available from Texaco Chemical Company, 103.2 grams, 1,3-bis(1',2'-anhydro-4'-trimellitate)-2-acetoxypropane available as AC-32 TM from AC Dianhydride Chemical Company, 213.5 grams, and butyltin oxide hydroxide catalyst, 0.3 gram. The resulting mixture was heated to 170° C. over a period of 3 hours. The temperature was then increased to 185° C. and the pressure of the reactor was then reduced slowly to 1 Torr over a 3 hour period, and maintained under these conditions for an additional hour. The polyester imide, poly-(propyleneoxypropyleneoxypropyleneoxy-propylene 1,2-imidophenyl-4-carbonyl-1'-oxy-2'-(acetyloxy)-3'-oxypropylene-4"-carbonyl-phenyl-1", 2"-imido), was then discharged through the bottom drain valve and weighed to be 256.7 grams of product. The glass transition temperature of the resulting polyester imide resin was measured using an E. I. DuPont Differential Scanning Calorimeter at 10° C. per minute, and found to be 53.9° C. A 2 gram polyester imide sample was then digested in 20 grams of tetrahydrofuran, and the soluble portion was filtered off and found to display a number average molecular weight of 3,400 grams per mole and a weight average molecular weight of 24,500 grams per mole by gel permeation chromatography, and using polystyrene as the standard.

EXAMPLE II

A polyester imide resin derived from diamino terminated propylene oxide JD-230 TM, 1,3-bis-(1',2'-anhydro-4'-trimellityl)-2-acetoxypropane and 1,2,3-tris-(1',2'-anhydro-4'-trimellityl)propane was prepared as follows.

To a 1 liter Parr reactor equipped with a bottom drain valve, a magnetic stirrer and distillation condenser apparatus for trapping the water byproduct, were added the diamino terminated propylene oxide JD-230 TM available from Texaco Chemical Company (115 grams), and a mixture of 1,3-bis-(1',2'-anhydro-4'-trimellitate)-2-acetoxypropane and 1,2,3-tris-(1',2'-anhydro-4'-trimellityl)propane available as AC-3205 TM from AC Dianhydride Chemical Company (250 grams) with an average molecular weight of 498 grams per mole. The resulting mixture was heated to 170° C. over a period of 3 hours. The temperature was then raised to 185° C. and the pressure of the reactor was then reduced slowly to 1 Torr over a 2 hour period, followed by raising the temperature to 195° C., and maintained under these conditions for an additional hour. The polyester imide, poly(propyleneoxypropyleneoxypropyleneoxy-propylene 1,2-imidophenyl-4-carbonyl-1'-oxy-2'-(acetyloxy)-3'-oxypropylene-4"carbonyl-phenyl-1",2"-imido)-g-2'-(1',2'-anhydro-4'-trimellitimido), was then discharged through the bottom drain valve and weighed to be 291 grams of product. The glass transition temperature of the resulting polyester imide resin was measured using an E. I. DuPont Differential Scanning Calorimeter at 10° C. per minute, and found to be 49.2° C. A 2 gram polyester imide sample was then digested in 20 grams of tetrahydrofuran, and the soluble portion was filtered off and found to display a number average molecular weight of 2,959 grams per mole and a weight average molecular weight of 9,269 grams per mole by gel permeation chromatography, and wherein polystyrene was selected as the standard.

EXAMPLE III

A polyester imide resin derived from diamino terminated propylene oxide JD-230 TM, 1,3-bis-(1',2'-anhydro-4'-trimellityl)-2-acetoxypropane and 1,2,3-tris-(1',2'-anhydro-4'-trimellityl)propane was prepared as follows.

To a 1 liter Parr reactor equipped with a bottom drain valve, a magnetic stirrer and distillation condenser apparatus for trapping the water byproduct, were added the diamino terminated propylene oxide JD-230 TM available from Texaco Chemical Company, 115 grams, and a mixture of 1,3-bis-(1',2'-anhydro-4'-trimellitate)-2-acetoxypropane and 1,2,3-tris-(1',2'-anhydro-4'-trimellityl)propane available as AC-3205 TM from AC Dianhydride Chemical Company, 250 grams, with an average molecular weight of 498 grams per mole. The resulting mixture was heated to 170° C. over a period of 3 hours. The temperature was then raised to 185° C. and the pressure of the reactor was then reduced slowly to 1 Torr over a 2 hour period, followed by raising the temperature to 195° C., and maintained under these conditions for an additional 90 minutes. The polyester imide, poly-(propyleneoxypropyleneoxypropyleneoxypropylene 1,2-imidophenyl-4-carbonyl-1'-oxy-2'-(acetyloxy)-3'-oxypropylene-4"-carbonyl-phenyl-1",2"-imido)-g-2'-(1',2'-anhydro-4'-trimellitimido), was then discharged through the bottom drain valve and weighed to be 271 grams of product. The glass transition temperature of the resulting polyester imide resin was measured using an E. I. DuPont Differential Scanning Calorimeter at 10° C. per minute, and found to be 50.8° C. A 2 gram polyester imide sample was then digested in 20 grams of tetrahydrofuran, and the soluble portion was filtered off and found to display a number average molecular weight of 3,513 grams per mole and a weight average molecular weight of 41,712 grams per mole by gel permeation chromatography and using polystyrene as the standard.

EXAMPLE IV

A polyester imide resin derived from 7.5 mole equivalent of diamino terminated ethylylene oxide EDR-192 TM, 42.5 mole equivalent of diamino terminated propylene oxide JD-230 TM, and 50 mole percent of a mixture of 1,3-bis-(1',2'-anhydro-4'-trimellityl)-2-acetoxypropane and 1,2,3- tris-(1',2'-anhydro-4'-trimellityl)propane was prepared as follows.

To a 1 liter Parr reactor equipped with a bottom drain valve, a magnetic stirrer and distillation condenser apparatus for trapping the water byproduct, were added the diamino terminated propylene oxide JD-230 ™, 97.7 grams, the diamino terminated ethylene oxide EDR-192 ™, 14.4 grams, both available from Texaco Chemical Company, 115 grams, and a mixture of 1,3-bis-(1',2'-anhydro-4'-trimellitate)-2-acetoxypropane and 1,2,3-tris-(1',2'-anhydro-4'-trimellityl)propane available as AC-3205 ™ from AC Dianhydride Chemical Company, 250 grams, with an average molecular weight of 498 grams per mole. The resulting mixture was heated to 170° C. over a period of 3 hours. The temperature was then raised to 180° C. and the pressure of the reactor was then reduced slowly to 1 Torr over a 2 hour period. The polyester imide, copoly-(propyleneoxy-propyleneoxypropyleneoxy-propylene 1,2-imidophenyl-4-carbonyl-1'-oxy-2'-(acetyloxy)-3'-oxypropylene-4''-carbonyl-phenyl-1'',2''-imido)-copoly-ethyleneoxyethyleneoxyethyleneoxy-ethyl 1,2-imidophenyl-4-carbonyl-1'-oxy-2'-(acetyloxy)-3'-oxypropylene-4''-carbonyl-phenyl-1'',2''-imido)-g-2'-(1',2'-anhydro-4'-trimellitimido), was then discharged through the bottom drain valve and weighed to be 252 grams of product. The glass transition temperature of the resulting polyester imide resin was measured using an E. I. DuPont Differential Scanning Calorimeter at 10° C. per minute, and found to be 49.5° C. A 2 gram polyester imide sample was then digested in 20 grams of tetrahydrofuran, and the soluble portion was filtered off and found to display a number average molecular weight of 2,888 grams per mole and a weight average molecular weight of 40,039 grams per mole by gel permeation chromatography and using polystyrene as the standard.

EXAMPLE V

A polyester imide resin derived from 1,8-diaminooctane, and a mixture of 1,3-bis-(1',2'-anhydro-4'-trimellityl)-2-acetoxypropane and 1,2,3-tris-(1',2'-anhydro-4'-trimellityl)propane was prepared as follows.

To a 1 liter Parr reactor equipped with a bottom drain valve, a magnetic stirrer and distillation condenser apparatus for trapping the water byproduct, were added 1,8-diaminooctane, 72.1 grams, and a mixture of 1,3-bis-(1',2'-anhydro-4'-trimellitate)-2-acetoxypropane and 1,2,3-tris-(1',2'-anhydro-4'-trimellityl)propane available as AC-3205 from AC Dianhydride Chemical Company, 250 grams, with an average molecular weight of 498 grams per mole. The resulting mixture was heated to 170° C. over a period of 3 hours. The temperature was then raised to 180° C. and the pressure of the reactor was then reduced slowly to 1 Torr over a 2 hour period. The polyester imide, poly-(octylene 1,2-imidophenyl-4-carbonyl-1'-oxy-2'-(acetyloxy)-3'-oxypropylene-4''-carbonyl-phenyl-1'',2''-imido)-g-2'-(1',2'-anhydro-4'-trimellitimido), was then discharged through the bottom drain valve and weighed to be 256 grams of product. The glass transition temperature of the resulting polyester imide resin was measured using an E. I. DuPont Differential Scanning Calorimeter at 10° C. per minute, and found to be 53.3° C.

EXAMPLE VI

A polyester imide resin derived from 1,4-diaminobutane, and a mixture of 1,3-bis-(1',2'-anhydro-4'-trimellityl)-2-acetoxypropane and 1,2,3-tris-(1',2'-anhydro-4'-trimellityl)propane was prepared as follows.

To a 1 liter Parr reactor equipped with a bottom drain valve, a magnetic stirrer and distillation condenser apparatus for trapping the water byproduct, were added 1,4-diaminobutane, 44.1 grams, and a mixture of 1,3-bis-(1',2'-anhydro-4'-trimellitate)-2-acetoxypropane and 1,2,3-tris-(1',2'-anhydro-4'-trimellityl)propane available as AC-3205 ™ from AC Dianhydride Chemical Company, 250 grams, with an average molecular weight of 498 grams per mole. The resulting mixture was heated to 170° C. over a period of 3 hours. The temperature was then raised to 180° C. and the pressure of the reactor was then reduced slowly to 1 Torr over a 2 hour period. The polyester imide, poly-(butylene 1,2-imidophenyl-4-carbonyl-1'-oxy-2'-(acetyloxy)-3'-oxypropylene-4''-carbonyl-phenyl-1'',2''-imido)-g-2'-(1',2'-anhydro-4'-trimellitimido), was then discharged through the bottom drain valve and weighed to be 205 grams of product. The glass transition temperature of the resulting polyester imide resin was measured using an E. I. DuPont Differential Scanning Calorimeter at 10° C. per minute, and found to be 83.4° C.

EXAMPLE VII

A polyester imide resin derived from 12.5 mole equivalent of 1,4-diaminobutane, 37.5 mole equivalent of diamino terminated propylene oxide JD-230 ™, and 50 mole equivalent of a mixture of 1,3-bis-(1',2'-anhydro-4'-trimellityl)-2-acetoxypropane and 1,2,3-tris-(1',2'-anhydro-4'-trimellityl)propane was prepared as follows.

To a 1 liter Parr reactor equipped with a bottom drain valve, a magnetic stirrer and distillation condenser apparatus for trapping the water byproduct, were added 1,4-diaminobutane, 11 grams, the diamino terminated propylene propylene oxide JD-230 ™, 86.2 grams, and a mixture of 1,3-bis-(1',2'-anhydro-4'-trimellitate)-2-acetoxypropane and 1,2,3-tris(1',2'-anhydro-4'-trimellityl)propane available as AC-3205 ™ from AC Dianhydride Chemical Company, 250 grams, with an average molecular weight of 498 grams per mole. The resulting mixture was heated to 170° C. over a period of 3 hours. The temperature was then raised to 180° C. and the pressure of the reactor was then reduced slowly to 1 Torr over a 2 hour period. The polyester imide, copoly-(butylene 1,2-imidophenyl-4-carbonyl-1'-oxy-2'-(acetyloxy)-3'-oxypropylene-4''-carbonyl-phenyl-1'',2''-imido) copoly-(propyleneoxypropyleneoxypropyleneoxypropylene 1,2-imidophenyl-4-carbonyl-1'-oxy-2'-(acetyloxy)-3'-oxypropylene-4''-carbonylphenyl-1'',2''-imido)-g-2'-(1',2'-anhydro-4'-trimellitimido), was then discharged through the bottom drain valve and weighed to be 237 grams of product. The glass transition temperature of the resulting polyester imide resin was measured using an E. I. DuPont Differential Scanning Calorimeter at 10° C. per minute, and found to be 58.3° C.

EXAMPLE VIII

A polyester imide resin derived from 12.5 mole equivalent of 1,5-diamino-2-methylpentane, 37.5 mole equivalent of diamino terminated propylene oxide JD-230 ™, and 50 mole equivalent of a mixture of 1,3-bis(1',2'-anhydro-4'-trimellityl)-2-acetoxypropane and 1,2,3-tris-(1',2'-anhydro-4'-trimellityl)propane was prepared as follows.

To a 1 liter Parr reactor equipped with a bottom drain valve, a magnetic stirrer and distillation condenser apparatus for trapping the water byproduct, were added 1,5-diamino-2-methylpentane, 14.5 grams, the diamino terminated propylene propylene oxide JD-230 TM, 86.2 grams, and a mixture of 1,3-bis-(1',2'-anhydro-4'-trimellitate)-2-acetoxypropane and 1,2,3-tris-(1',2'-anhydro-4'-trimellityl)propane available a,s AC-3205 TM from AC Dianhydride Chemical Company, 250 grams, with an average molecular weight of 498 grams per mole. The resulting mixture was heated to 170° C. over a period of 3 hours. The temperature was then raised to 180° C. and the pressure of the reactor was then reduced slowly to 1 Torr over a 2 hour period. The polyester imide, copoly-(methylpentylene 1,2-imidophenyl-4-carbonyl-1'-oxy-2'-(acetyloxy)-3'-oxypropylene-4''-carbonyl-phenyl-1'',2''-imido ) copoly(propyleneoxypropyleneoxypropyleneoxypropylene 1,2-imidophenyl-4-carbonyl-1'-oxy-2'-(acetyloxy)-3'-oxypropylene-4''-carbonyl-phenyl-1'',2''-imido)-g-2'-(1',2'-anhydro-4'-trimellitimido), was then discharged through the bottom drain valve. The glass transition temperature of the resulting polyester imide resin was measured using an E. I. DuPont Differential Scanning Calorimeter at 10° C. per minute, and found to be 56.7° C.

EXAMPLE IX

A toner composition comprised of 94 percent by weight of the polyimide of Example I, and 6 percent by weight of REGAL 330 ® black pigment was prepared as follows.

The polyimide of Example I was in the form of a large chunk. The resulting polymer was ground to smaller particles using a Black and Decker coffee bean grinder. After grinding, 95 grams (95 percent by weight of toner) of the polyimide of Example I were mixed with 5 grams of REGAL 330 ® pigment (5 percent by weight of toner). The two components were dry blended on a roll mill. A HAAKE melt mixer was then used to melt mix the aforementioned mixture at a temperature of 140° C. The mixture was then removed, cooled to ambient temperature, and ground to smaller particles using a Black and Decker coffee bean grinder. An 8 inch Sturtevant micronizer was used to reduce the particle size further. After grinding, the toner was measured to display an average volume diameter particle size of 7.2 microns with a geometric distribution of 1.37 as measured by a Coulter Counter. A developer composition was prepared by roll milling the aforementioned toner, 3 parts by weight, with 100 parts by weight of carrier, about 90 microns in diameter, comprised of a steel core with polyvinylidene polymer coating, 0.175 weight percent thereof. The aforementioned developer was incorporated into a 20 percent humidity chamber for 24 hours, and the triboelectric charge was measured by the known blow-off Faraday Cage apparatus, followed by placing the developer in an 80 percent humidity chamber for 24 hours. The relative humidity sensitivity of this toner was then calculated as the ratio of the charges obtained in the 20 percent and 80 percent humidity chamber, and found to be 2.40. Unfused copies of the above developer were then produced using a Xerox Corporation 1075 imaging apparatus, and the images were subsequently fused. The toner minimum fixing temperature was 137° C. and hot offset temperature was 150° C.

EXAMPLE X

A toner composition comprised of 94 percent by weight of the polyimide of Example I, and 6 percent by weight of REGAL 330 ® black pigment was prepared as follows.

The polyimide of Example III was in the form of a large chunk. The resulting polymer was ground to smaller particles using a Black and Decker coffee bean grinder. After grinding, 95 grams (95 percent by weight of toner) of the polyimide of Example I were mixed with 5 grams of REGAL 330 ® pigment (5 percent by weight of toner). The two components were dry blended on a roll mill. A HAAKE melt mixer was then used to melt mix the aforementioned mixture at a temperature of 140° C. The mixture was then removed, cooled to ambient temperature, and ground to smaller particles using a Black and Decker coffee bean grinder. An 8 inch Sturtevant micronizer was used to reduce the particle size further. After grinding, the toner was measured to display an average volume diameter particle size of 7.8 microns with a geometric distribution of 1.38 as measured by a Coulter Counter. A developer composition was prepared by roll milling the aforementioned toner, 3 parts by weight, with 100 parts by weight of carrier, about 90 microns in diameter, comprised of a steel core with polyvinylidene polymer coating, 0.175 weight percent thereof. The aforementioned developer was incorporated into a 20 percent humidity chamber for 24 hours, and the triboelectric charge was measured by the known blow-off Faraday Cage apparatus, followed by subjecting the developer in an 80 percent humidity chamber for 24 hours. The relative humidity sensitivity of this toner was then calculated as the ratio of the charges obtained in the 20 percent and 80 percent humidity chamber, and found to be 3.0. Unfused copies of the above developer were then produced using a Xerox Corporation 1075 imaging apparatus, and the images were subsequently fused. The toner minimum fixing temperature was 137° C. and hot offset temperature was 195° C.

A vinyl offset measurement was accomplished by obtaining a copy of fused solid area image (from above) and placing it in contact with a section of a standard clear vinyl material (polyvinylchloride) containing the commonly utilized di-(2-ethylhexyl)phthalate plasticizer, and contacting of the toner image with the above vinyl material for a period of 48 hours at a temperature of 50° C. and a pressure of 10 grams per centimeter squared. The toner image and vinyl are then separated and the amount of toner that has offset onto a 5×2 centimeter section of vinyl is determined. For the copies generated by this Example I, a vinyl offset of 0 percent was found as calculated by Equation (1). Furthermore, no deterioration in image matte quality was detected visually. For comparative purposes, a styrenebutylmethacrylate based toner, such as the Xerox Corporation 1065 or the Xerox Corporation 1090 toner, has a vinyl offset of 82.5 percent as calculated by Equation (1) with severe deterioration in image matte quality. Additionally, a styrene-butadiene based toner, such as the Xerox 5090 or Xerox 5034 toner, has a vinyl offset of 0.04 percent as calculated by Equation (1) with large deterioration in image matte quality.

EXAMPLE XI

Deinking of the fused images resulting from Example X by the minimum conventional repulping process as utilized by the paper recycling industry was accomplished as follows.

About 10 imaged developed copies of Example X were added to a laboratory repulper along with sufficient 45° C. deionized water to achieve a pulp consistency to 3 percent. The pH was adjusted to 11.3 with sodium hydroxide. This slurry was agitated in the repulper at 25° C. for 60 minutes total repulping time. At the conclusion of repulping, samples, of the pulp were drawn for preparation of standard TAPPI handsheets; 0.6 gram samples were used for handsheets for image analysis.

Ink specks and other contaminants were most commonly removed from recycled pulp by the flotation technique. For flotation studies, an 867 gram sample of the repulped slurry was further diluted with deionized water to 1 percent consistency, or a total volume of about 2.6 liters. This sample was then adjusted to 45° C., and added to a Denver Laboratory Flotation Cell. Flotation to remove the toner image specks was conducted at 1,200 RPM rotor speed for a total of three minutes, with the ink-laden foam being removed manually throughout the run. To determine the efficiency of toner removal, samples of the purified pulp slurry were then again converted to handsheets using the procedures described above.

The toner size from 50 to 700 microns diameter, and frequency of toner specks in the handsheets were determined by image analysis over a total area of 0.5 cm$^2$ for repulped samples, and over 6 cm$^2$ for the flotation-purified samples.

The results of the image analysis showed that images from Example X disintegrated on repulping to submicron pigmented particles due to the decomposition and/or solubilization of the tone resin. By comparison, toner from images generated on a Xerox Corporation 1065 imaging apparatus or copier with Xerox Corporation 1065 toner as a control was found to disintegrate into large particles, the most abundant of which were 125 microns in diameter.

As expected, the larger particles from the 1065 toner were more difficult to remove by flotation. As measured by image analysis, only 93 percent of the 1065 toner specks as measured by area coverage was removed by floating, while 100 percent of the toner of Example X was removed by this deinking procedure.

The waste water comprised of the solubilized toner resin, pigment/dye, and caustic components such as sodium bicarbonate (sodium hydroxide) was then neutralized to pH of 7 by the addition of dilute hydrochloric acid, and wherein the polyimide toner resin was found to precipitate from solution. The precipitate was then filtered, and hence, reclaimed from the waste water. The polyimide resin precipitate was then air dried, and identified by differential scanning calorimetry to display a glass transition temperature of 53.5° C.

Other modifications of the present invention may occur to those skilled in the art subsequent to a review of the present application, and these modifications, including equivalents thereof, are intended to be included within the scope of the present invention.

What is claimed is:

1. A toner composition comprised of pigment, and a polyester imide of the formula

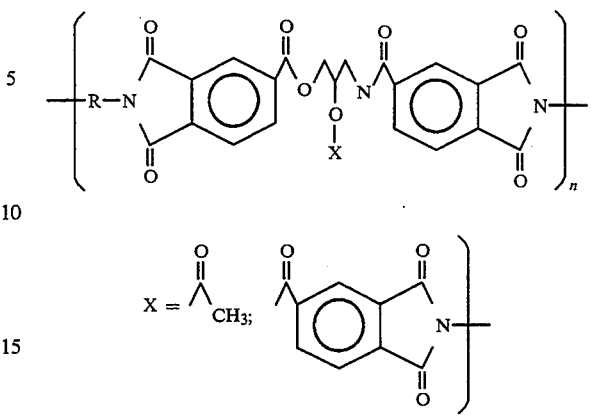

wherein n represents the number of monomer segments; X is acetyl or a carbonyl-phthalimido; and R is alkylene, oxyalkylene, or polyoxyalkylene.

2. A toner in accordance with claim 1 wherein X is comprised of a mixture of from about 80 mole percent to about 99.9 mole percent of the acetyl group, and from about 0.1 mole percent to about 20 mole percent of a 4-carbonyl-1,2-phthalimido branching group.

3. A toner in accordance with claim 1 wherein R is methylene, ethylene, propylene, butylene, pentylene, hexylene, heptylene, octylene, nonylene, decylene, undecylene, dodecylene, stearylene, laurylene, or mixtures thereof.

4. A toner in accordance with claim 1 wherein said R is an oxyalkylene selected from the group consisting of diethylene oxide, dipropylene oxide, triethylene oxide, polypropylene oxide, polyethyleneoxide, and mixtures thereof.

5. A toner in accordance with claim 1 wherein the polyester imide resin is selected from the group consisting of poly-(ethylene 1,2-imidophenyl-4-carbonyl-1'-oxy-2'-(acetyloxy)-3'-oxypropylene-4''-carbonylphenyl-1'',2''-imido), poly-(propylene 1,2-imidophenyl-4-carbonyl-1'-oxy-2'-(acetyloxy)-3'-oxypropylene-4''-carbonylphenyl-1'',2''-imido), poly-(butylene 1,2-imidophenyl-4-carbonyl-1'-oxy-2'-(acetyloxy)-3'-oxypropylene-4''-carbonylphenyl-1'',2''-imido), poly-(2-methylpentylene 1,2-imidophenyl-4-carbonyl-1'-oxy-2'-(acetyloxy)-3'-oxypropylene-4''-carbonylphenyl-1'',2''-imido), poly-(ethyleneoxyethyleneoxyethylene 1,2-imidophenyl-4-carbonyl-1'-oxy-2'-(acetyloxy)-3'-oxypropylene-4''-carbonylphenyl-1'',2''-imido), poly-(ethyleneoxyethyleneoxyethyleneoxyethylene 1,2-imidophenyl-4-carbonyl-1'-oxy-2'-(acetyloxy)-3'-oxypropylene-4''-carbonylphenyl-1'',2''-imido), poly-(propyleneoxypropyleneoxypropyleneoxypropylene 1,2-imidophenyl-4-carbonyl-1'-oxy-2'-(acetyloxy)-3'-oxypropylene-4''-carbonylphenyl-1'',2''-imido), copoly(propyleneoxypropyleneoxypropyleneoxypropylene 1,2-imidophenyl-4-carbonyl-1'-oxy-2'-(acetyloxy)-3'-oxypropylene-4''-carbonylphenyl-1'', 2''-imido)-copoly(propyleneoxypropyleneoxypropyleneoxypropylene 1,2-imidophenyl-4-carbonyl-1'-oxy-3'-oxypropylene-4''-carbonylphenyl-1'', 2''-imido)-g-2'-(4'''carbonyl-phenyl-1''',2'''-phthalimido), and mixtures thereof.

6. A toner in accordance with claim 1 wherein the polyimide has a $M_n$ of from about 1,500 to about 20,000, and an $M_w$ of from about 2,500 to about 100,000.

7. A toner in accordance with claim 1 which possesses a low fixing temperature of from about 120° C. to about 145° C., and a broad fusing latitude of from about 40° C. to about 120° C.

8. A toner in accordance with claim 1 wherein the polyester imide is obtained from the reaction of from about 0.40 mole equivalent to about 0.55 mole equivalent of a dianhydride or mixture of dianhydride and trianhydride, and from about 0.40 mole equivalent to about 0.55 mole equivalent of a diamine.

9. A toner in accordance with claim 8 wherein the dianhydride is selected from the group consisting of 1,2-bis-(1',2'-anhydro-4'-trimellitate)-2-hydroxypropane, 1,2-bis-(1',2'-anhydro-4'-trimellitate)-2-acetoxypropane, or the mixture of dianhydride and trianhydride is selected from the group consisting of 1,2-bis-(1',2'-anhydro-4'-trimellitate)-2-hydroxypropane, 1,2-bis-(1',2'-anhydro-4'-trimellitate)-2-acetoxypropane, and 1,2,3-tris-(1',2'-anhydro-4'-trimellitate)-propane.

10. A toner in accordance with claim 8 wherein the diamine is selected from the group consisting of diaminoethane, diaminopropane, 2,3-diaminopropane, diaminobutane, diaminopentane, diamino-2-methylpentane, (DYTEK A TM) diaminohexane, diamino-trimethylhexane, diaminoheptane, diaminooctane, diaminononane, diaminodecane, diaminododecane, diaminoterminated diethylene oxide, diaminoterminated triethylene oxide, and a polyoxyalkylene of the formula

wherein R represents a hydrogen or alkyl group, and n represents monomer segments and is a number of from about 1 to about 10.

11. A toner composition in accordance with claim 1 with a glass transition temperature thereof of from about 50° C. to about 65° C.

12. A toner composition in accordance with claim 1 with a relative humidity sensitivity of from about 1.01 to about 2.3.

13. A toner composition in accordance with claim 1 further including a charge enhancing additive incorporated into the toner, or present on the surface of the toner.

14. A toner composition in accordance with claim 1 further containing a wax component with a weight average molecular weight of from about 1,000 to about 10,000.

15. A toner composition in accordance with claim 1 further containing as external additives metal salts of a fatty acid, colloidal silicas, or mixtures thereof.

16. A toner composition in accordance with claim 1 wherein the pigment is carbon black, magnetites, or mixtures thereof, cyan, magenta, yellow, red, blue, green, brown, or mixtures thereof.

17. A developer composition comprised of the toner composition of claim 1, and carrier particles.

18. A developer composition in accordance with claim 17 wherein the carrier particles are comprised of ferrites, steel, or an iron powder with an optional coating, or mixture of coatings.

19. A method of imaging which comprises formulating an electrostatic latent image on a photoconductive imaging member, affecting development thereof with the toner composition of claim 1, and thereafter transferring the developed image to a suitable substrate.

20. A deinkable toner composition comprised of pigment and a polyimide of the formula

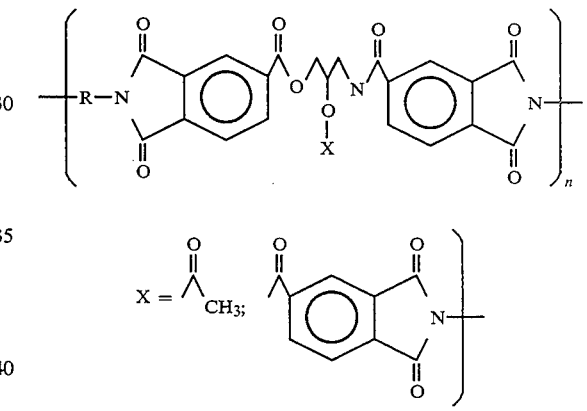

wherein n represents the number of monomer segments; X is acetyl or a carbonyl-phthalimido; and R is alkylene, oxyalkylene, or polyoxyalkylene.

21. A toner in accordance with claim 20 which is deinkable by liberation from paper fibers.

22. A toner in accordance with claim 1 wherein n is a number of from about 10 to about 1,000.

* * * * *